(12) United States Patent
Ueno

(10) Patent No.: US 7,301,678 B2
(45) Date of Patent: Nov. 27, 2007

(54) IMAGE READING DEVICE AND GAIN SETTING METHOD IN IMAGE READING DEVICE

(75) Inventor: Sueo Ueno, Shizuoka-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 988 days.

(21) Appl. No.: 10/373,205

(22) Filed: Feb. 26, 2003

(65) Prior Publication Data

US 2004/0165228 A1    Aug. 26, 2004

(51) Int. Cl.
*H04N 1/40* (2006.01)
*H04N 1/04* (2006.01)

(52) U.S. Cl. .............. 358/474; 358/445; 358/446; 358/483; 358/482; 358/443

(58) Field of Classification Search .......... 348/297, 348/243, 300, 298, 294; 358/452, 445, 446, 358/483, 482, 512–514, 443; 250/208.1, 250/214 AG, 206; 382/270
See application file for complete search history.

(56) References Cited

U.S. PATENT DOCUMENTS 4,760,463 A * 7/1988 Nonoyama et al. ......... 358/452

6,774,942 B1 * 8/2004 Salcedo et al. ............. 348/243
2004/0061796 A1 * 4/2004 Honda et al. ............... 348/297

FOREIGN PATENT DOCUMENTS

| JP | 04256975 A | * | 9/1992 |
|----|------------|---|--------|
| JP | 11-234517 A | | 8/1999 |
| JP | 11-275320 A | | 10/1999 |
| JP | 2000-59622 A | | 2/2000 |

* cited by examiner

*Primary Examiner*—Cheukfan Lee
(74) *Attorney, Agent, or Firm*—Foley & Lardner LLP

(57) ABSTRACT

An image reading device includes a CCD which photoelectrically converts optical information and outputs an image signal in an analog form, a PGA which receives an output from the CCD, amplifies the output with a programmable gain, and outputs the output, an ADC which receives an output from the PGA, A/D-converts the output, and outputs an image signal in a digital form, and a CPU which calculates a gain which makes an output from the ADC match a reference value by using an output from the ADC and the reference value, thereby setting a gain for the PGA. This arrangement makes it possible to set a gain in a short period of time and shorten the first copy time in an image forming apparatus or MFP system using the image reading device of this invention.

5 Claims, 6 Drawing Sheets

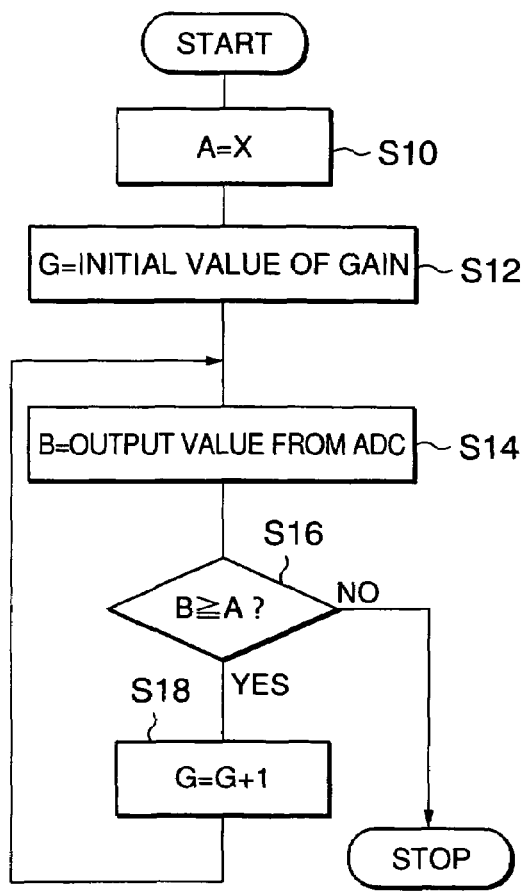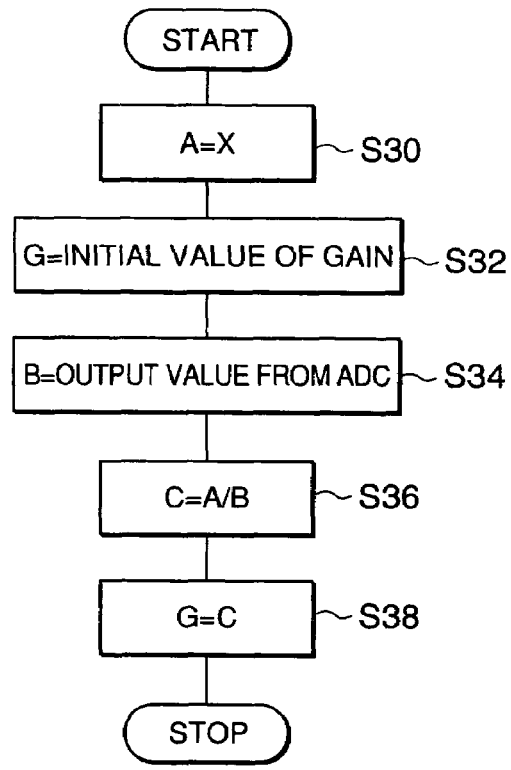
FIG.5
(PRIOR ART)
FIG.6

IMAGE READING DEVICE AND GAIN SETTING METHOD IN IMAGE READING DEVICE

BACKGROUND OF THE INVENTION

In an image reading device such as a scanner used in an image forming apparatus or MFP (Multi Functional Printing) system, a signal output from a CCD (Charge-Coupled Device) upon photoelectric conversion must be amplified by using an amplifier before image processing. This is because outputs from the CCD contain variations in the light amount of the lamp, changes in light amount due to secular changes in the lamp, variations in mirror reflectivity, variations in CCD sensitivity, and the like, and hence need to be set at a predetermined level before image processing.

Conventionally, a gain is set in such a preamplifier in the following manner.

First of all, the gain is set in advance to the minimum magnification in the early stage. The exposure lamp is then turned on to read light reflected by a white reference plate by using the CCD. The analog value of an output signal from the CCD is converted into a digital value and compared with a target value.

If they do not coincide with each other, the set gain value of the preamplifier is increased from the minimum magnification by a predetermined value. As described above, light reflected by the white reference plate is read again by the CCD. The analog value of an output signal from the CCD is converted into digital value and compared with the target value.

If they do not coincide with each other, the set magnification is increased by a predetermined value. When a read output value reaches the target value or more after repetition of such operation, the gain setting operation is finished. The gain is set to the resultant value.

Such a conventional gain setting method takes much time to obtain a gain with which an output signal having a target value can be obtained from the CCD. This prolongs the time between turning on the power of the image reading device and starting read operation. As a consequence, in an image forming apparatus or MFP system, the first copy time slows down, resulting in low customer satisfaction level.

The present invention has been made in consideration of the above situation, and has as its object to provide an image reading device and a gain setting method in the image reading device, which can shorten the time taken for the image reading device to start read operation.

SUMMARY OF THE INVENTION

An image reading device of the present invention comprises a CCD which photoelectrically converts optical information and outputs an image signal in an analog form, a PGA which receives an output from the CCD, amplifies the output with a programmable gain, and outputs the output, an ADC which receives an output from the PGA, A/D-converts the output, and outputs an image signal in a digital form, and a CPU which calculates a gain which makes an output from the ADC match a reference value by using an output from the ADC and the reference value, and setting a gain for the PGA.

The PGA may comprise an input terminal to which an output from the CCD is supplied, a first switch and first resistor connected in series with each other between the input terminal and a node, a second switch and second resistor which are connected in series with each other and connected in parallel with the first switch and first resistor between the input terminal and the node, . . . , and an nth switch and nth resistor which are connected in series with each other and connected in parallel with the first switch and first resistor, the second switch and second resistor, . . . , and the (n−1) th switch and (n−1) th resistor between the input terminal and the node, an operational amplifier whose inverting input terminal is connected to the node, non-inverting input terminal is grounded, and output terminal is connected to an input terminal of the ADC, and an (n+1) th resistor connected in series between the output terminal of the operational amplifier and the node, and the CPU may set a gain by ON/OFF-controlling the first switch, the second switch, . . . , and the nth switch.

This device can further comprise a document table, an exposure lamp which exposes a document placed on the document table, and a mirror which reflects light reflected by the document exposed by the exposure lamp and supplies the light as the optical information to the CCD.

The CPU may use the reference value A and an output value B from the ADC when a gain of the PGA is an initial value to set a computation value C of A/B as a gain for the PGA.

The CPU may set a gain for the PGA by repeating processing of comparing the reference value R with an output value B1 from the ADC when a gain of the PGA is set to an initial value G1, setting the gain of the PGA to G1 if B1≧R, comparing the reference value R with an output value B2 from the ADC obtained when the gain of the PGA is set to a value G2 obtained by adding a predetermined value i to G1 if not B1≧R, setting the gain of the PGA to G1 if B2≧R, . . . , setting the gain of the PGA to Gn−1 if Bn−1 (n is an integer not less than 2)≧R, comparing the reference value R with an output value Bn from the ADC obtained when the gain of the PGA is set to a value Gn obtained by adding the predetermined value i to Gn−1 if no Bn−1≧R, and setting the gain of the PGA to Gn if Bn≧R, . . . .

A gain setting method in an image reading device according to the present invention comprises the step of photoelectrically converting optical information and outputting an image signal in an analog form by using a CCD, the step of amplifying the image signal by using a PGA which can program a gain, the step of A/D-converting the amplified image signal by using an ADC and outputting an image signal in a digital form, and the step of using a CPU to calculate a gain which makes an output from the ADC match a reference value by using an output from the ADC and the reference value and to set a gain for the PGA.

In the step of setting the gain for the PGA, the reference value A and an output value B from the ADC obtained when a gain of the PGA is an initial value may be used to set a computation value C of A/B as a gain for the PGA.

In the step of setting the gain for the PGA, a gain for the PGA may be set by repeating processing of comparing the reference value R with an output value B1 from the ADC when a gain of the PGA is set to an initial value G1, setting the gain of the PGA to G1 if B1≧R, comparing the reference value R with an output value B2 from the ADC obtained when the gain of the PGA is set to a value G2 obtained by adding a predetermined value i to G1 if not B1≧R, setting the gain of the PGA to G1 if B2≧R, . . . , setting the gain of the PGA to Gn−1 if Bn−1≧R, comparing the reference value R with an output value Bn from the ADC obtained when the gain of the PGA is set to a value Gn obtained by adding the predetermined value i to Gn−1 if no Bn−1≧R, and setting the gain of the PGA to Gn if Bn≧R, . . . .

BRIEF DESCRIPTION OF THE DRAWINGS

FIG. 5 is a flow chart showing a procedure for controlling the gain of the PGA in a conventional image reading device;

FIG. 6 is a flow chart showing a procedure for controlling the gain of the PGA in the image reading device according to the embodiment of the present invention;

DESCRIPTION OF THE PREFERRED EMBODIMENTS

An embodiment of the present invention will be described below with reference to the accompanying drawings.

Figure 1:
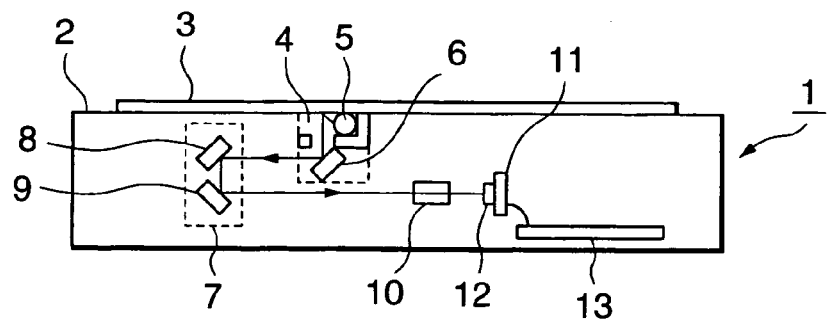
FIG. 1 is a block diagram showing an outer appearance of an image reading device according to an embodiment of the present invention.

FIG. 1 shows the schematic arrangement of a scanner 1 as an image reading device according to this embodiment.

The scanner 1 includes a document table 2, a first carriage 4 having an exposure lamp 5 and a first mirror 6, a second carriage 7 having a second mirror 8 and a third mirror 9, a lens 10, a CCD board 11 on which a CCD 12 is mounted, a scanner control board 13 on which a scanner control circuit is formed, and a motor (not shown).

A document 3 is placed on the document table 2. The exposure lamp 5 of the first carriage 4 exposes the document 3, and reflected light is reflected by the first mirror 6. The light reflected by the first mirror 6 is reflected by the second mirror 8 and third mirror 9 of the second carriage 7. The CCD 12 receives the light reflected by the third mirror 9 through the lens 10. The CCD 12 reads one line on the document 3 in the main scanning direction.

When the first and second carriages 4 and 5 which are driven by a motor move in the sub-scanning direction, the whole document 3 can be read. The scanner control circuit formed on the scanner control board 13 controls the operations of the motor, first carriage 4, second carriage 7, and CCD 12.

In this manner, the light and shade of light reflected by the surface of the document 3 are photoelectrically converted by the CCD 12 to generate an analog signal. This signal is then binarized by a binarization circuit formed on the CCD board 11 or scanner control board 13 and converted into a digital signal, as described later.

Figure 2:
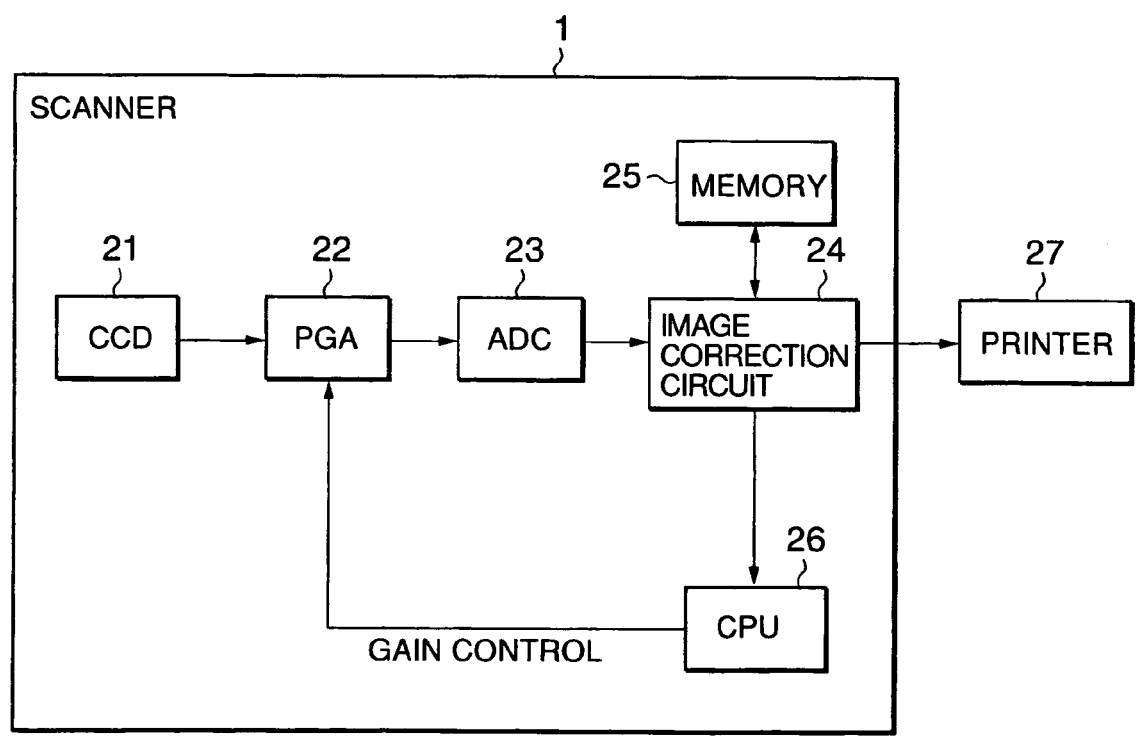
FIG. 2 is a block diagram showing the circuit arrangement of the image reading device.

FIG. 2 shows a circuit arrangement for performing signal processing after photoelectric conversion in the scanner 1.

The analog signal output from a CCD 21 which represents the gray scale of an image is amplified to an amplitude necessary for A/D conversion by a PGA (Programmable Gain Amplifier) 22.

The analog signal amplified by the PGA 22 is A/D-converted by an ADC (Analog Digital Converter) and output as a binarized image signal.

This image signal is output from the scanner 1 after undergoing, for example, shading by the CCD 21, correction of variations unique to the CCD 21, RGB correction, interline correction, lens aberration correction, and the like. This signal is output to an external device such as a printer 27. The output signal from an image correction circuit 24 is stored in a memory 25 and supplied to a CPU (Central Processing Unit) 26 to be used to set a gain in the PGA 22.

Figure 3:
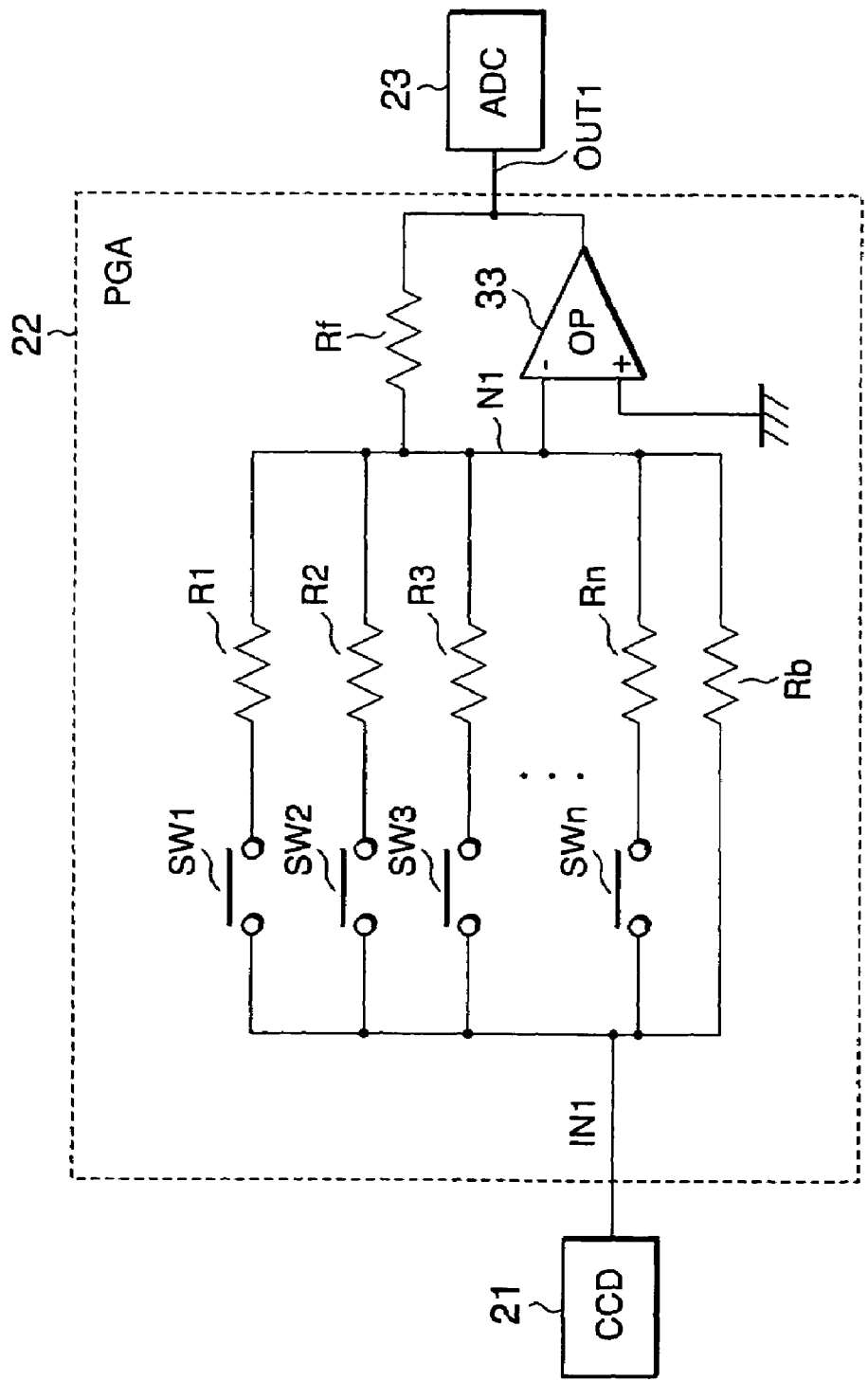
FIG. 3 is a block diagram showing the arrangement of PGA (Programmable Gain Amplifier) in the image reading device.

FIG. 3 shows the arrangement of the PGA 22. The principle of gain control will be described.

An input terminal IN1 of the PGA 22 is connected to the output terminal of the CCD 21, and output terminal OUT1 is connected to the input terminal of an ADC 23. Pairs of switch SW1 and resistor R1, switch SW2 and resistor R2, switch SW3 and resistor R3, . . . , and switch SWn (n is an integer equal to or more than 1) and resistor Rn which are respectively connected in series are connected in parallel between the input terminal IN1 and a node N1. The inverting input terminal of an operational amplifier 33 is connected to the node N1, and its non-inverting input terminal is grounded. The output terminal of operational amplifier 33 is connected to the node N1 through a resistor Rf and connected to an output terminal OUT1.

The operational amplifier 33 amplifies the value of the signal output from the CCD 21 in accordance with the input range of the ADC 23. The gain of the operational amplifier 33 must be set to make an input value to the ADC 23 constant.

When all the switches SW1 to SWn are off, the gain of the operational amplifier 33 is determined by the ratio of the resistor Rf to a resistor Rb. In normal times, Rf:Rb=1:1, and hence gain=1.

When the switch SW1 is turned on, the gain of the operational amplifier 33 is determined by the ratio of the resistor Rf to the parallel-connected resistors Rb and R1. In this case, for example, R1//Rb is set to 1/2Rb, and hence gain=2.

When only the switch SW2 is turned on, the gain of the operational amplifier 33 is determined by the ratio of the resistor Rf to the parallel-connected resistors Rb and R2. In this case, for example, R2//Rb is set to 1/3Rb, and hence gain=3.

Likewise, when only the switch SW3 is turned on, gain=4 . . . , and when only the switch SWn is turned on, gain=n+1.

In this case, the switches SW1, SW2, . . . , and SWn are ON/OFF-controlled by the CPU 26 mounted on the scanner control board 13.

Figure 4:
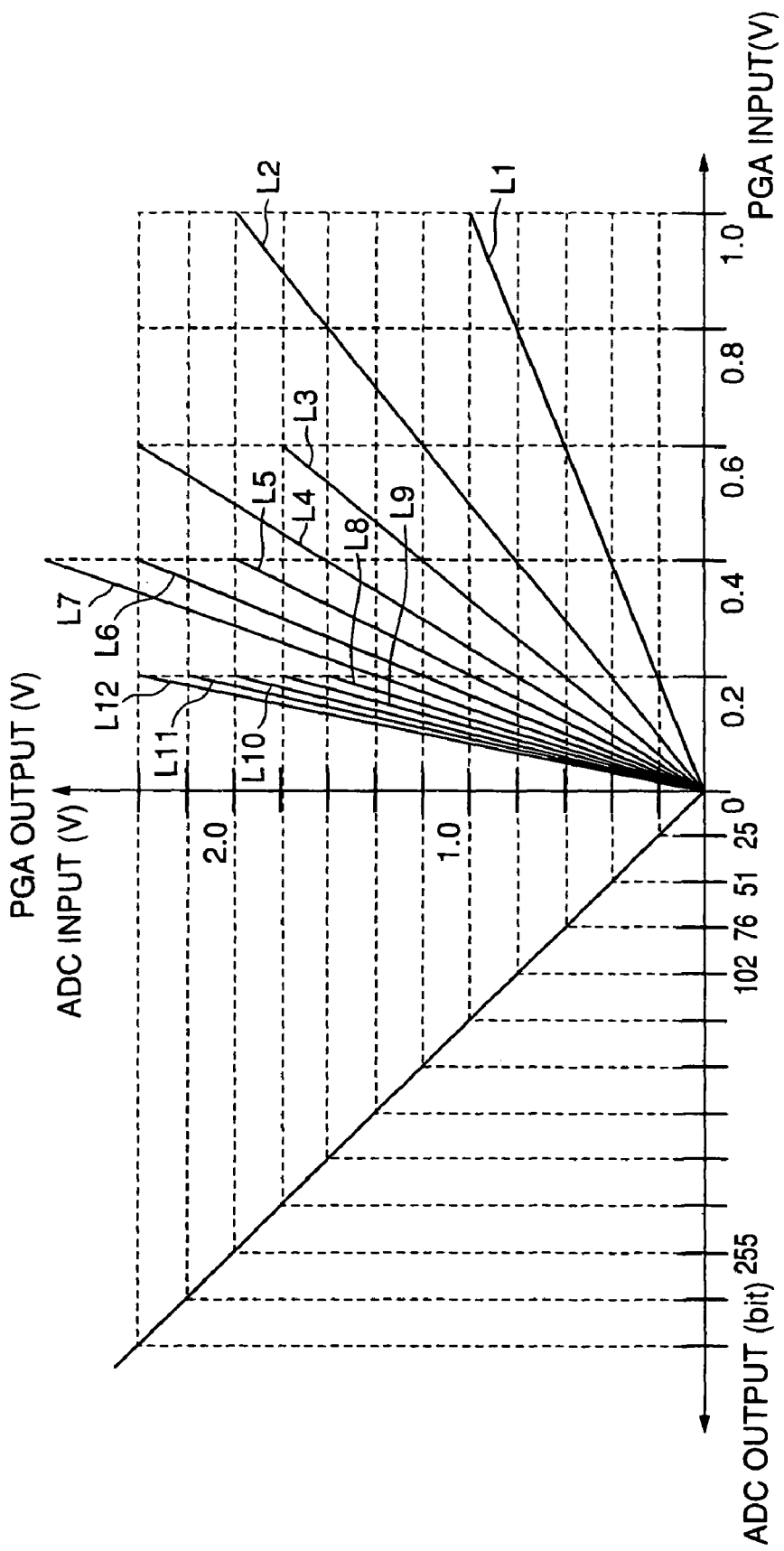
FIG. 4 is a graph showing the relationship between the input voltage and output voltage for the PGA and the output value from an ADC (Analog Digital Converter) to which the output voltage from the PGA is applied.

The principle of controlling the gain of the PGA in the conventional image reading device will be described below with reference to FIG. 4. In the graph of FIG. 4, a PGA input voltage is plotted on the right side of the abscissa; PGA output voltage=ADC input voltage, on the ordinate; and an output bit from the ADC, on the left side of the abscissa.

In the early stage, for example, the gain of the PGA is set to 1. Assume that the input voltage to the PGA is 0.2 V, and 255 bits are required as an output value from the ADC.

In the early stage, since gain=1, the output voltage from the PGA, i.e., the input voltage to the ADC, is 0.2 V, as indicated by a straight line L1 in FIG. 4. As a consequence, the ADC output becomes 25 bits.

The 25 bits are compared with 255 bits which are a desired number of bits. Since the above number of bits has not reached the desired number of bits, the gain is increased by one step, e.g., set to 2. When gain=2, as indicated by a straight line L2 in FIG. 4, PGA output voltage=ADC input voltage becomes 0.4 V. As a result, the ADC output becomes 51 bits.

The 51 bits are compared with 255 bits which are the desired number of bits. Since the above number of bits has not reached the desired number of bits, the gain is further increased by one step, e.g., set to 3. When gain=3, as indicated by a straight line L3 in FIG. 4, PGA output voltage=ADC input voltage becomes 0.6 V. As a result, the ADC output becomes 76 bits.

This procedure is repeated to increase the gain one by one until the ADC output reaches 255. Straight lines L4, L5, L6, . . . , and L10 respectively represent the relationships between the ADC input voltages and the ADC output voltages when the gain is 4, 5, 6, . . . , and 10. When the gain reaches 10, the ADC output value reaches the desired value, i.e., 255 bits.

When the ADC output reaches the desired output value, i.e., 255 bits, the gain setting operation is completed.

FIG. 5 shows a procedure for PGA gain control in the conventional image reading device.

In step S10, a target value X (in this case, X=255) of an output from the ADC is input to A.

In step S12, an initial value (in this case, 1) is input to a gain G.

In step S14, an output value from the ADC with the gain being set to the initial value is input to B.

In step S16, the output value B from the ADC is compared with the target value A to check whether B is equal to or more than A.

If B is less than A, a predetermined value (in this case, 1) is added to the gain G in step S18. The flow then returns to step S14. When B reaches A or more, the gain setting processing is terminated.

As described, conventionally, many steps must be repeated, and hence it takes much time to set a gain.

In contrast, in this embodiment, gain setting processing is performed by the procedure shown in the flow chart of FIG. 6.

In step S30, a target value X (in this case, X=255) of an output from the ADC is input to A.

In step S32, an initial value (in this case, 1) is input to the gain G.

In step S34, an output value (in this case, 25 bits) from the ADC 23 with gain G=initial value is input to B.

In step S36, the values of A and B are input to C=A/B to calculate this equation, thereby obtaining the value of C (in this case, 255/25=10).

In step S38, the obtained value of C is set to the gain G. With this operation, the gain setting processing is terminated.

As described above, according to this embodiment, a computation is performed by using an output voltage from the PGA 22 (an output value from the ADC 23) and a target value in the early stage in which the gain is set to an initial value to determine a set gain value by one arithmetic process. This makes it possible to shorten the time required to set a gain. As a consequence, the first copy time can be shortened in an image forming apparatus or MFP system using the image reading device according to this embodiment, and hence the customer satisfaction can be increased.

The above embodiment is an example and does not limit the present invention. This embodiment can be variously modified within the technical range of the present invention. In the arrangement shown in, for example, FIG. 1, the CPU 26 receives an output from the image correction circuit 24 and compares it with a reference value to control the gain of the PGA 22. However, the CPU 26 may receive an output from the ADC 23 and compare it with a reference value to control the gain of the PGA 22.

In addition, the circuit arrangement of the PGA is not limited to the one shown in FIG. 3, and any circuit arrangement can be used as long as gains can be set at predetermined intervals.

Figure 7:
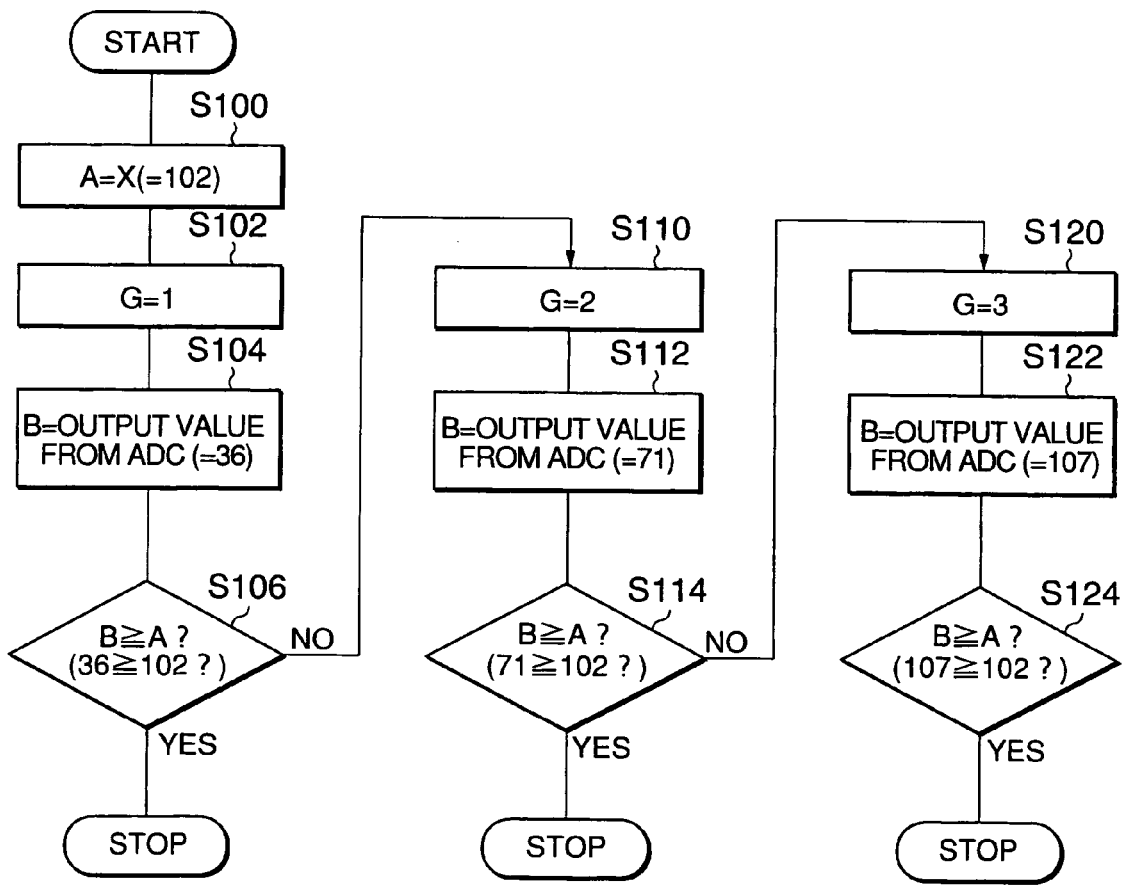
FIG. 7 is a flow chart showing a procedure for controlling the gain of a PGA in an image reading device according to another embodiment of the present invention.

In the above embodiment, a set gain value is determined by one arithmetic process. In another embodiment to be described below, however, a set gain value is determined by a plurality of arithmetic processes. FIG. 7 shows a procedure for arithmetic processes in this case.

Assume that the following initial condition is set:
(1) CCD output voltage=0.7 (V)
(2) necessary input voltage to ADC≦2.0 (V)
(3) input voltage range for ADC=5.0 (V)
(4) output voltage range for ADC=255 (bits)
(5) peak detection threshold of ADC=2 (V)
(6) output at peak detection threshold of ADC=2 (V)/5 (V)=102 (bits)

Under the above condition, the gain of the PGA is increased to 1 dB, 2 dB, 3 dB, . . . . . An output value (bits) from the ADC at each gain is compared with the necessary output value (≧102 (bits)). A set gain value is set to the gain set when this output value reaches the necessary output value or more, and the processing is terminated.

In step S100 in FIG. 7, the target value X (=102) of an output from the ADC is input to A.

In step S102, an initial value (=1) is input to a gain G.

In step S104, an output value (=36 bits) from the ADC with gain G=initial value (=1) is input to B.

In step S106, it is checked whether B≧A. If this condition is satisfied, the processing is terminated. Otherwise, the flow advances to step S110.

In step S110, gain G=2 is set.

In step S112, an output value (=71 bits) from the ADC with gain G=2 is input to B.

In step S114, it is checked whether B≧A. If this condition is satisfied, the processing is terminated. Otherwise, the flow advances to step S120.

In step S120, gain G=3 is set.

In step S122, an output value (=107 bits) from the ADC with gain G=3 is input to B.

In step S124, it is checked whether B≧A. In this case, since this condition is satisfied, the gain setting processing is terminated.

In this manner, the gain of the PGA is increased by adding a predetermined value to the initial value, and the gain obtained when an output value from the ADC reaches a desired value or more is set as a set gain value. This makes it possible to finish setting processing in a shorter period of time than in the prior art.

Figure 8:
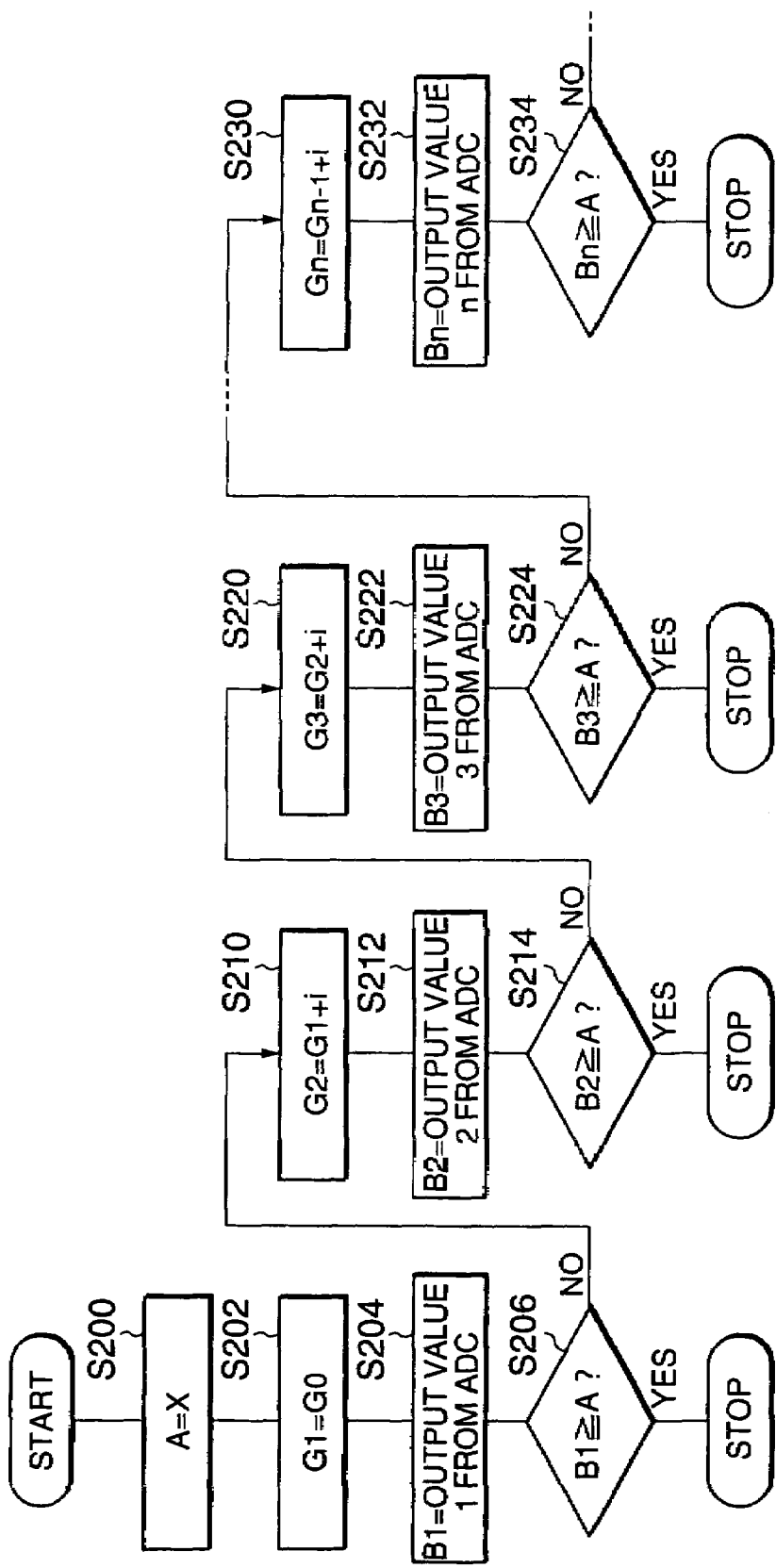
FIG. 8 is a flow chart showing a generalized procedure as an example of the procedure shown in FIG. 7.

The flow chart of FIG. 8 shows a more generalized procedure.

In step S200, a target value X of an output from the ADC is input to A.

In step S202, an initial value G0 is input to a gain G1.

In step S204, an output value from the ADC with gain G1=G0 is input to B1.

In step S206, it is checked whether B1≧A. If this condition is satisfied, the processing is terminated. Otherwise, the flow advances to step S210.

In step S210, the value obtained by adding a predetermined value i to the gain G1 is set as a gain G2.

In step S212, an output value from the ADC with gain G2=G1+i is input to B2.

In step S214, it is checked whether $B2 \geq A$. If this condition is satisfied, the processing is terminated. Otherwise, the flow advances to step S220.

In step S220, the value obtained by adding the predetermined value i to the gain G2 is set as a gain G3.

In step S222, an output value from the ADC with gain G3=G2+i is input to B3.

In step S224, it is checked whether $B3 \geq A$. If this condition is satisfied, the processing is terminated. Otherwise, the flow advances to step S230.

In step S230, the value obtained by adding the predetermined value i to a gain Gn−1 (n is an integer equal to or more than 2) is set as a gain Gn.

In step S232, an output value from the ADC with gain Gn=Gn−1+i is input to Bn.

In step S234, it is checked whether $Bn \geq A$. If this condition is satisfied, the processing is terminated. Otherwise, the above steps are repeated until $Bn \geq A$ is satisfied.

As described with reference to FIG. 7, the gain of the PGA is increased by adding a predetermined value to the initial value in accordance with the flow chart of FIG. 8, and the resultant output value from the ADC is compared with a desired value. The gain obtained when the output value reaches the desired value is set as a set gain value, thereby completing the processing within a shorter period of time than in the prior art.

What is claimed is:

1. An image reading device, comprising:
   a charge coupled device which photoelectrically converts optical information and outputs an image signal in an analog form;
   a programmable gain amplifier which receives an output from said charge coupled device, amplifies the output with a programmable gain, and outputs the output;
   an analog digital converter which receives an output from said programmable gain amplifier, analog/digital-converts the output, and outputs an image signal in a digital form; and
   a central processing unit which calculates a gain which makes an output from said analog digital converter match a reference value by using an output from said analog digital converter and the reference value, and setting a gain for said programmable gain amplifier,
   wherein said programmable gain amplifier, comprises:
      an input terminal to which an output from said charge coupled device is supplied;
      a first switch and first resistor connected in series with each other between the input terminal and a node;
      a second switch and second resistor which are connected in series with each other and connected in parallel with the first switch and first resistor between the input terminal and the node;
      an nth switch and nth resistor which are connected in series with each other and connected in parallel with the first switch and first resistor, the second switch and second resistor, . . . , and the (n−1)th switch and (n−1)th resistor between the input terminal and the node;
      an operational amplifier whose inverting input terminal is connected to the node, non-inverting input terminal is grounded, and output terminal is connected to an input terminal of said analog digital converter; and
      an (n+1)th resistor connected in series between the output terminal of the operational amplifier and the node, and
   wherein said Central Processing Unit sets a gain by ON/OFF-controlling the first switch, the second switch, . . . , and the nth switch.

2. An image reading device, comprising:
   a charge coupled device which photoelectrically converts optical information and outputs an image signal in an analog form;
   a programmable gain amplifier which receives an output from said charge coupled device, amplifies the output with a programmable gain, and outputs the output;
   an analog digital converter which receives an output from said programmable gain amplifier, analog/digital-converts the output, and outputs an image signal in a digital form; and
   a central processing unit which calculates a gain which makes an output from said analog digital converter match a reference value by using an output from said analog digital converter and the reference value, and setting a gain for said programmable gain amplifier,
   wherein said central processing unit uses the reference value A and an output value B from said analog digital converter when a gain of said programmable gain amplifier is an initial value to set a computation value C of A/B as a gain for said programmable gain amplifier.

3. An image reading device, comprising:
   a charge coupled device which photoelectrically converts optical information and outputs an image signal in an analog form;
   a programmable gain amplifier which receives an output from said charge coupled device, amplifies the output with a programmable gain, and outputs the output;
   an analog digital converter which receives an output from said programmable gain amplifier, analog/digital-converts the output, and outputs an image signal in a digital form; and
   a central processing unit which calculates a gain which makes an output from said analog digital converter match a reference value by using an output from said analog digital converter and the reference value, and setting a gain for said programmable gain amplifier,
   wherein said central processing unit sets a gain for said programmable gain amplifier by repeating processing of comparing the reference value R with an output value B1 from said analog digital converter when a gain of said programmable gain amplifier is set to an initial value G1, setting the gain of said programmable gain amplifier to G1 if $B1 \geq R$, comparing the reference value R with an output value B2 from said analog digital converter obtained when the gain of said programmable gain amplifier is set to a value G2 obtained by adding a predetermined value i to G1 if not $B1 \geq R$, setting the gain of said programmable gain amplifier to G1 if $B2 \geq R$, . . . , setting the gain of said programmable gain amplifier to Gn−1 (n is an integer not less than 2) if $Bn-1 \geq R$, comparing the reference value R with an output value Bn from said analog digital converter obtained when the gain of said programmable gain amplifier is set to a value Gn obtained by adding the predetermined value i to Gn−1 if no $Bn-1 \geq R$, and setting the gain of said programmable gain amplifier to Gn if $Bn \geq R$, . . . .

4. A gain setting method in an image reading device, comprising:
   the step of photoelectrically converting optical information and outputting an image signal in an analog form by using a charge-coupled device;

the step of amplifying the image signal by using a programmable gain amplifier which can program a gain;

the step of analog/digital-converting the amplified image signal by using an analog digital converter and outputting an image signal in a digital form; and the step of using a central processing unit to calculate a gain which makes an output from the analog digital converter match a reference value by using an output from the analog digital converter and the reference value to set a gain for the programmable gain amplifier, wherein in the step of setting the gain for the programmable gain amplifier, a reference value A and an output value B from the analog digital converter obtained when a gain of the programmable gain amplifier is an initial value are used to set a computation value C of A/B as a gain for the programmable gain amplifier.

5. A gain setting method in an image reading device, comprising:

the step of photoelectrically converting optical information and outputting an image signal in an analog form by using a charge-coupled device;

the step of amplifying the image signal by using a programmable gain amplifier which can program a gain;

the step of analog/digital-converting the amplified image signal by using an analog digital converter and outputting an image signal in a digital form; and the step of using a central processing unit to calculate a gain which makes an output from the analog digital converter match a reference value by using an output from the analog digital converter and the reference value to set a gain for the programmable gain amplifier, wherein in the step of setting the gain for the programmable gain amplifier, a gain for the programmable gain amplifier is set by repeating processing of comparing the reference value R with an output value B1 from the analog digital converter when a gain of the programmable gain amplifier is set to an initial value G1, setting the gain of the programmable gain amplifier to G1 if $B1 \geq R$, comparing the reference value R with an output value B2 from the analog digital converter obtained when the gain of the programmable gain amplifier is set to a value G2 obtained by adding a predetermined value i to G1 if not $B1 \geq R$, setting the gain of the programmable gain amplifier to G1 if $B2 \geq R$, ..., setting the gain of the programmable gain amplifier to Gn−1 if $Bn-1 \geq R$, comparing the reference value R with an output value Bn from the analog digital converter obtained when the gain of the programmable gain amplifier is set to a value Gn obtained by adding the predetermined value i to Gn−1 if no $Bn-1 \geq R$, and setting the gain of the programmable gain amplifier to Gn if $Bn \geq R$, ....

* * * * *